United States Patent
Kim et al.

(10) Patent No.: US 8,564,211 B2
(45) Date of Patent: Oct. 22, 2013

(54) METHOD OF DRIVING A LIGHT SOURCE AND LIGHT SOURCE APPARATUS FOR PERFORMING THE METHOD

(75) Inventors: Seung-Wan Kim, Asan-si (KR); Won-Sik Oh, Asan-si (KR); Ja-Min Koo, Yongin-si (KR)

(73) Assignee: Samsung Display Co., Ltd. (KR)

( * ) Notice: Subject to any disclaimer, the term of this patent is extended or adjusted under 35 U.S.C. 154(b) by 347 days.

(21) Appl. No.: 12/959,247

(22) Filed: Dec. 2, 2010

(65) Prior Publication Data

US 2011/0163689 A1 Jul. 7, 2011

(30) Foreign Application Priority Data

Jan. 6, 2010 (KR) .................. 10-2010-0000751

(51) Int. Cl.
*H05B 37/00* (2006.01)

(52) U.S. Cl.
USPC ........ 315/185 S; 315/291; 315/247; 315/312; 315/224

(58) Field of Classification Search
USPC ........ 315/291, 224, 307, 129, 185 S, 209 SC, 315/312
See application file for complete search history.

(56) References Cited

U.S. PATENT DOCUMENTS

| | | | | |
|---|---|---|---|---|
| 7,378,805 B2* | 5/2008 | Oh et al. | ........ | 315/291 |
| 7,456,581 B2* | 11/2008 | Lee et al. | ........ | 315/219 |
| 8,198,822 B2* | 6/2012 | Byun et al. | ........ | 315/291 |
| 8,237,372 B2* | 8/2012 | Hoogzaad et al. | ........ | 315/291 |

FOREIGN PATENT DOCUMENTS

| | | |
|---|---|---|
| JP | 2005-190751 A | 7/2005 |
| JP | 2007-188692 A | 7/2007 |
| JP | 2008-130377 A | 6/2008 |
| JP | 2008-300209 A | 12/2008 |
| KR | 1020060119018 A | 11/2006 |
| KR | 1020080018570 A | 2/2008 |
| KR | 1020090090665 A | 8/2009 |

* cited by examiner

*Primary Examiner* — Tuyet Thi Vo
(74) *Attorney, Agent, or Firm* — Innovation Counsel LLP

(57) ABSTRACT

A light source apparatus includes a light source disposed adjacent to a side portion of a light guide plate and a light source driver driving the light source. The light source driver includes a booster and a protecting circuit. The booster boosts an input voltage to a driving voltage for driving the light source. The protecting circuit selectively cuts off the input voltage applied to the booster according to an output current of the booster, reducing the risk of damage to the driver due to shorts, overcurrents, or the like.

23 Claims, 4 Drawing Sheets

METHOD OF DRIVING A LIGHT SOURCE AND LIGHT SOURCE APPARATUS FOR PERFORMING THE METHOD

PRIORITY STATEMENT

This application claims priority under 35 U.S.C. §119 to Korean Patent Application No. 2010-751, filed on Jan. 6, 2010 in the Korean Intellectual Property Office (KIPO), the contents of which are herein incorporated by reference in their entirety.

BACKGROUND OF THE INVENTION

1. Field of the Invention

Example embodiments of the present invention relate generally to flat panel displays. More particularly, example embodiments of the present invention relate to a method of driving a light source with stability and a light source apparatus for performing the method.

2. Description of the Related Art

Generally, a display apparatus that includes a liquid crystal display (LCD) panel displays an image using light from a backlight assembly disposed under the LCD panel to transmit light through the LCD panel.

The backlight assembly includes a light source generating light to display an image on the LCD panel. The light source can be, for example, a cold cathode fluorescent lamp (CCFL), a flat fluorescent lamp (FFL), or a light emitting diode (LED).

The backlight assembly is typically classified as either a direct-illumination type backlight assembly or an edge-illumination type backlight assembly, according to the position of the light source with respect to a light guide plate. The direct-illumination type backlight assembly includes a plurality of light sources disposed under the LCD panel to illuminate an entire surface of the LCD panel. In contrast, the edge-illumination type backlight assembly employs light sources disposed along the sides of a light guide plate, e.g., under edges of the LCD panel. Light is provided to the LCD panel through the light guide plate.

The light source employed in the edge-illumination type backlight assembly typically receives a driving voltage and driving signals provided from a light source driving circuit through a lamp wire. During assembly, it is possible for a sheath of the lamp wire to be peeled off, allowing the lamp wire to make contact with the driving circuit, thus causing a short circuit that can direct overcurrents into the driving circuit, damaging its various elements.

SUMMARY OF THE INVENTION

Example embodiments of the present invention provide a method of driving a light source with stability by cutting off an input voltage when an overcurrent is detected.

Example embodiments of the present invention also provide a light source apparatus for performing the above-mentioned method.

In an example method of driving a light source according to the present invention, an input voltage is boosted to a driving voltage for driving the light source, the light source being disposed adjacent to a side portion of a light source plate. The driving voltage is applied to the light source. The input voltage is selectively cut off based on a current applied to the light source and resulting from the driving voltage.

In an example embodiment, the current applied to the light source may be detected. The input voltage may be cut off when a magnitude of the current exceeds a reference range.

In an example embodiment, the light source may include a plurality of light emitting diodes (LEDs).

In an example light source apparatus according to the present invention, the light source apparatus includes a light source and a light source driver. The light source is disposed adjacent to a side portion of a light guide plate. The light source driver includes a booster and a protecting circuit. The booster boosts an input voltage to a driving voltage for driving the light source. The protecting circuit selectively cuts off the input voltage applied to the booster according to an output current of the booster.

In an example embodiment, the protecting circuit may cut off the input voltage applied to the booster when a magnitude of the output current of the booster exceeds a first reference range In an example embodiment, the protecting circuit may include a current detector connected to an output terminal of the booster to detect a voltage corresponding to the output current of the booster, a first switching part switched on and off according to the voltage detected by the current detector and a photocoupler outputting a control voltage for cutting off the input voltage in response to a switching on of the first switching part.

In an example embodiment, the current detector may include a voltage detecting resistor connected between the booster and an output part of the light source driver to detect the voltage according to the output current of the booster, a voltage divider dividing the voltage detected by the voltage detecting resistor and a second switching part switched on and off according to a divided current that corresponds to the voltage divided by the voltage divider.

In an example embodiment, the protecting circuit may further include a first rectifying part comprising a first end portion connected to the current detector and a second end portion in electrical communication with a control electrode of the first switching part and a first filter comprising a first end portion connected to the second end portion of the first rectifying part and a second end portion connected to a ground terminal In an example embodiment, the protecting circuit may further include a second rectifying part comprising a first end portion connected to the first filter and a second end portion connected to the control electrode of the first switching part, and a second filter comprising a first end portion connected to the second end portion of the second rectifying part and the control electrode of the first switching part, and a second end portion connected to the ground terminal In an example embodiment, the light source apparatus may further include a first voltage generator selectively generating the input voltage In an example embodiment, the light source apparatus may further include a second voltage generator connected between an output terminal of the photocoupler and the first voltage generator to selectively apply a first power voltage or a second power voltage to the first voltage generator depending on whether the control voltage is received from the photocoupler. The first voltage generator may cut off the input voltage when the first power voltage is applied, and the first voltage generator may generate the input voltage and may apply the input voltage to the booster when the second power voltage is applied.

In an example embodiment, the light source apparatus may further include a second switching part connected between an input terminal of the booster and an output terminal of the photocoupler so as to ground the input voltage applied to the booster when the control voltage is received from the photocoupler.

In an example embodiment, the light source may include a plurality of LEDs.

In an example embodiment, the light source may include a first light source disposed adjacent to a first side portion of the light guide plate, a second light source disposed adjacent to a second side portion of the light guide plate, the second side portion being opposite to the first side portion, a third light source disposed adjacent to a third side portion of the light guide plate, the third side portion being connected to the first and second side portions and a fourth light source disposed adjacent to a fourth side portion of the light guide plate, the fourth side portion being opposite to the third side portion.

In an example embodiment, the light source may receive the driving voltage through a wire of a connector connected to an output part of the light source driver.

In an example embodiment, the light source driver may further include a boosting controller connected to an output terminal of the booster to control of the driving voltage output from the booster, and a driving chip controlling the boosting controller.

In an example embodiment, the light source driver may further include a current controller comprising an input electrode connected to an output terminal of the light source, a control electrode in electrical communication with the driving chip and an output electrode in electrical communication with a ground terminal. The driving chip may switch the current controller off when a magnitude of a current fed back from the light source exceeds a second reference range.

According to the present invention, the light source may be stably driven by selectively cutting off the input voltage applied to the booster generating the driving voltage based on the current applied to the light source according to the driving voltage for driving the light source.

BRIEF DESCRIPTION OF THE DRAWINGS

The above and other features and advantages of the present invention will become more apparent by describing in detailed example embodiments thereof with reference to the accompanying drawings, in which.

It is understood that the depictions in the figures are diagrammatic and not necessarily to scale. Also, like reference numerals refer to corresponding parts throughout the drawings.

DETAILED DESCRIPTION OF THE INVENTION

Figure 1:
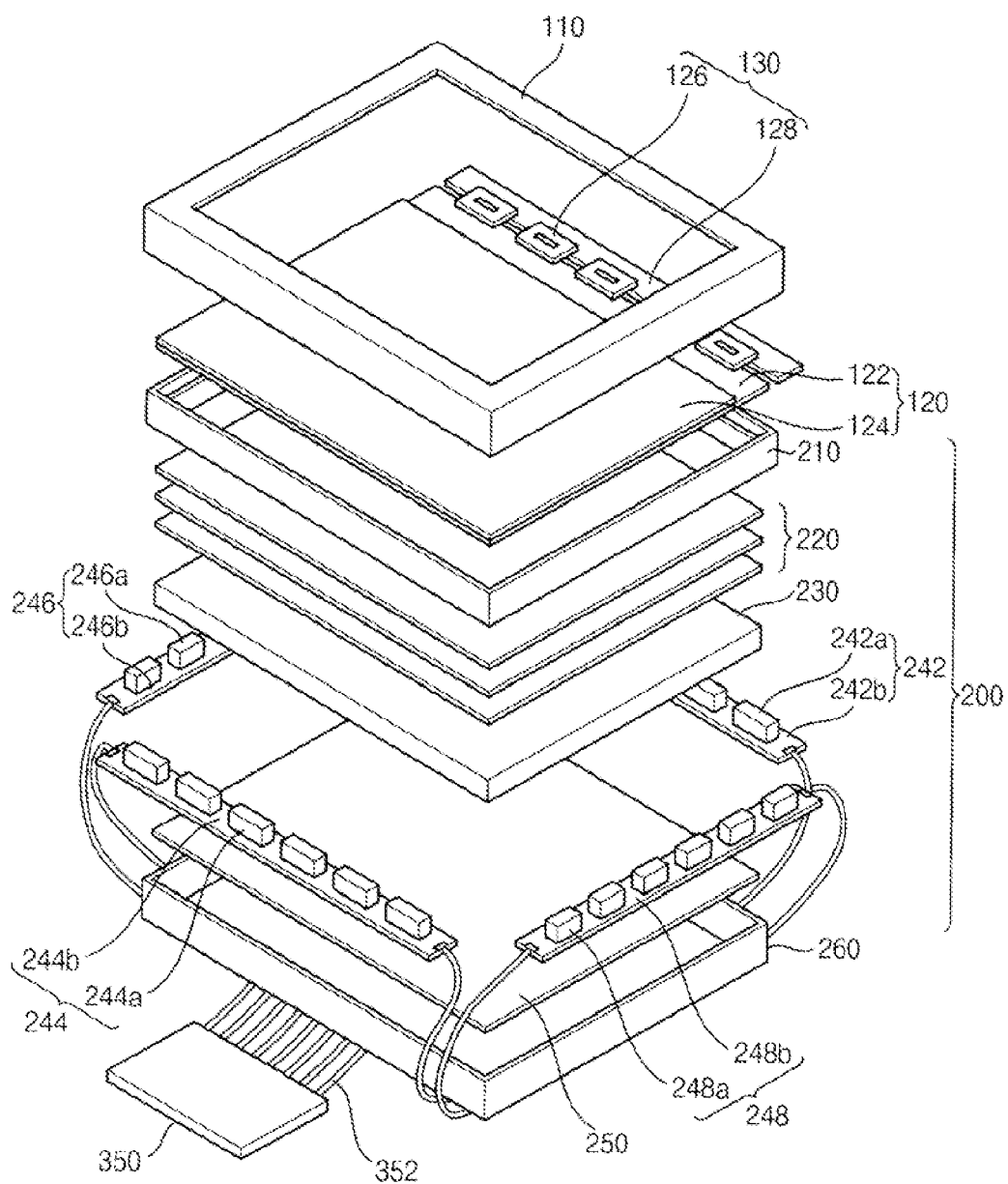
FIG. 1 is an exploded perspective view illustrating a display apparatus according to an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
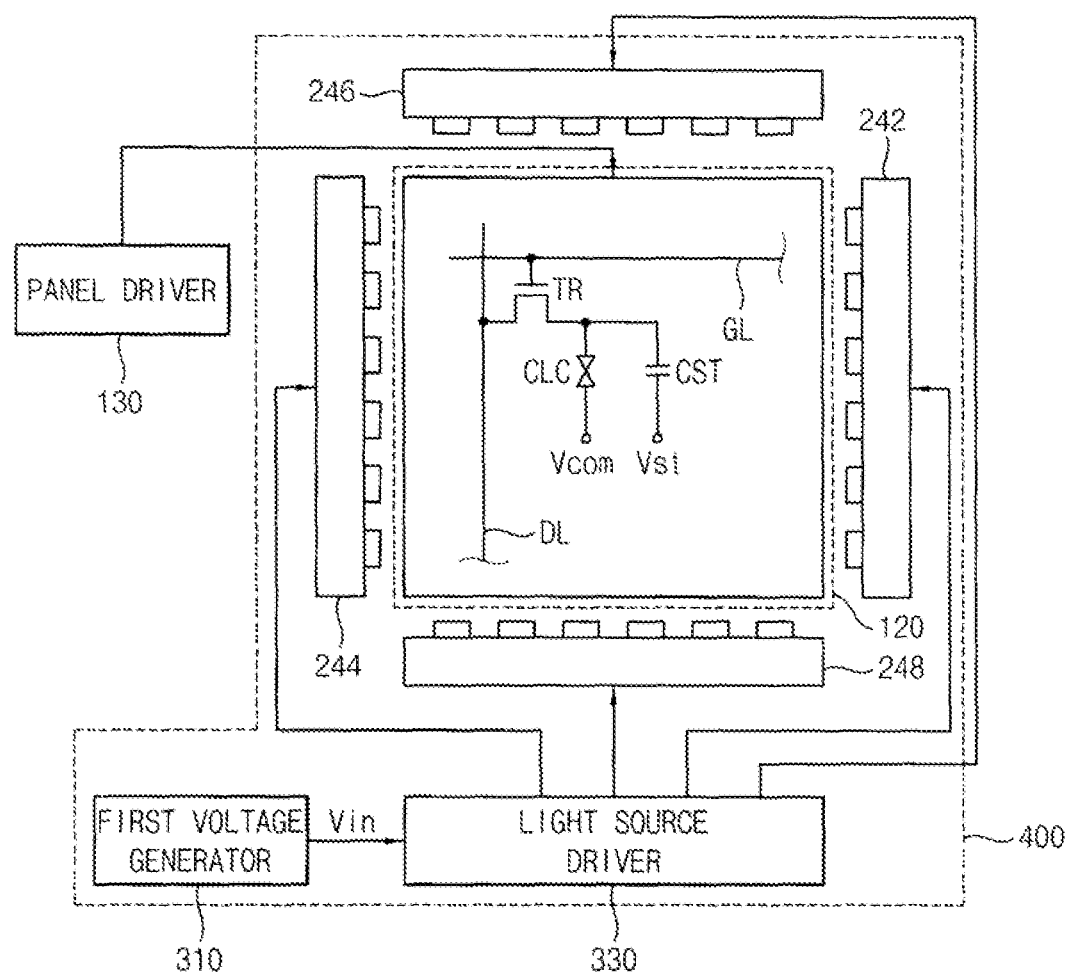
FIG. 2 is a block diagram illustrating the display apparatus of FIG. 1.

FIG. 1 is an exploded perspective view illustrating a display apparatus according to an example embodiment of the present invention. FIG. 2 is a block diagram illustrating the display apparatus of FIG. 1.

Referring to FIGS. 1 and 2, the display apparatus according to the present example embodiment includes a top chassis 110, a display panel 120, a panel driver 130 and a light source apparatus 400.

The top chassis 110 is disposed on the display panel 120, and protects the display panel 120 from an external impact. A window is formed on an upper surface of the top chassis 110, exposing a display region of the display panel 120.

The display panel 120 includes a first display substrate 122, a second display substrate 124 opposite to the first display substrate 122, and a liquid crystal layer (not shown) disposed between the first and second display substrates 122 and 124.

The first display substrate 122 may include a plurality of pixels P displaying an image. Each pixel P may include a switching element TR connected to a gate line GL and a data line DL, a liquid crystal capacitor CLC connected to the switching element TR and a storage capacitor CST connected to the switching element TR.

The panel driver 130 drives the display panel 120. The panel driver 130 may include a chip film package 126, a gate driver (not shown), and a source printed circuit board (PCB) 128 electrically connected to the chip film package 126. The chip film package 126 provides a data signal to the data line DL formed on the first display substrate 122. The gate driver provides a gate signal to the gate line GL formed on the first display substrate 122. The gate driver may be a chip film package type or an integrated circuit (IC) type driver.

The light source apparatus 400 is disposed under the display panel 120 and provides light to the display panel 120.

The light source apparatus 400 may include a light source part 200, a first voltage generator 310 and a light source driver 330.

The light source part 200 includes a mold frame 210, optical sheets 220, a light guide plate 230, a first light source module 242, a second light source module 244, a third light third light source module 246, a fourth light source module 248, a reflecting plate 250 and a receiving container 260.

The mold frame 210 is formed as a frame shape and includes a supporting surface supporting an edge of the display panel 120. The mold frame 210 receives and fixes the display panel 120.

The optical sheets 220 are disposed between the light guide plate 230 and the display panel 120 to improve optical efficiency. The optical sheets 220 may include a diffusion sheet, a prism sheet and a luminance condensing sheet.

The light guide plate 230 guides light generated from the first to fourth light modules 242, 244, 246 and 248 to the display panel 120.

The first light source module 242 is disposed adjacent to a first side portion of the light guide plate 230. The first light source module 242 includes a plurality of light emitting blocks 242a emitting light to the first side portion of the light guide plate 230, and a PCB 242b on which the light emitting blocks 242a are mounted. Each of the light emitting blocks 242a may include diode strings, and the diode strings include a plurality of light emitting diodes (LEDs) connected in series. The second light emitting module 244 is disposed adjacent to a second side portion of the light guide plate 230. The second side portion is opposite to the first side portion of the light guide plate 230. The second light source module 242 includes a plurality of light emitting blocks 244a emitting light to the second side portion of the light guide plate 230, and a PCB 244b on which the light emitting blocks 244a are mounted. Each of the light emitting blocks 244a may include diode strings, and the diode strings include a plurality of LEDs connected in series.

The third light source module 246 is disposed adjacent to a third side portion of the light guide plate 230, and the third side portion is connected to the first and second side portions of the light guide plate 230. The third light source module 246 includes a plurality of light emitting blocks 246a emitting light to the third side portion of the light guide plate 230, and a PCB 246b on which the light emitting blocks 246a are mounted. Each of the light emitting blocks 246a may include diode strings including a plurality of LEDs connected in series. The fourth light emitting module 248 is disposed adjacent to a fourth side portion of the light guide plate 230, and the fourth side portion is opposite to the third side portion of the light guide plate 230. The fourth light source module 248 includes a plurality of light emitting blocks 248a emitting light to the fourth side portion of the light guide plate 230, and a PCB 248b on which the light emitting blocks 248a are mounted. Each of the light emitting blocks 248a may include diode strings, and the diode strings include a plurality of LEDs connected in series. The PCBs 242b, 244b, 246b and 248b each include a base substrate, and circuit patterns patterned on the base substrate apply a driving voltage to the light emitting blocks 242a, 244a, 246a and 248a.

In the present example embodiment, the light source modules 242, 244, 246 and 248 are disposed adjacent to their respective side portions of the light guide plate 230. However, the disposition of the light source modules is not limited to the present example embodiment. For example, the light source modules may be disposed adjacent to only one side portion, or to two opposing side portions.

The reflecting plate 250 is disposed between the light guide plate 230 and a bottom plate of the receiving container 260, and reflects light leaked from the light guide plate 230.

The receiving container 260 includes a bottom plate, and a plurality of side walls extended from edges of the bottom plate to form a receiving space. The receiving container 260 receives the first to fourth light source modules 242, 244, 246 and 248, the reflecting plate 250, the light guide plate 230 and the optical sheets 220.

The display apparatus may further include the first voltage generator 310 and light source driver 330, which generate the driving voltage Vd that is applied to the first to fourth light source modules 242, 244, 246 and 248. The display apparatus may also include a driving circuit board 350 on which circuits of the light source driver 330 are mounted. The first voltage generator 310 generates an input voltage Vin. Using the input voltage Vin, the light source driver 330 generates the driving voltage Vd for driving the diode strings.

The driving circuit board 350 may be disposed on a rear surface of the receiving container 260. Each of the first to fourth light source modules 242, 244, 246 and 248 is electrically connected to the driving circuit board 350 through a lamp wire 352.

Figure 3:
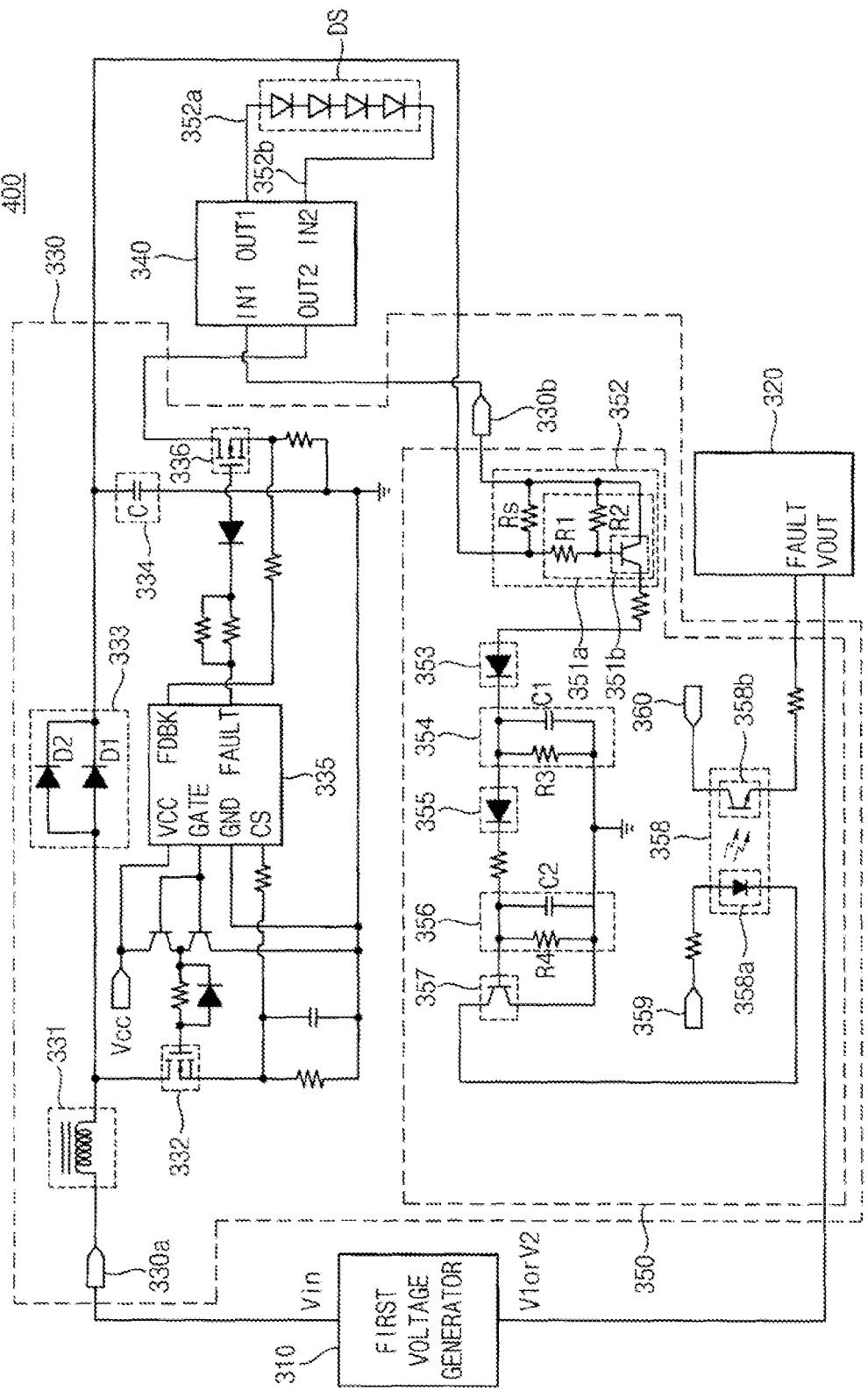
FIG. 3 is a circuit diagram illustrating a light source apparatus of FIG. 2.

FIG. 3 is a circuit diagram illustrating a light source apparatus of FIG. 2.

Referring to FIGS. 1 to 3, the light source apparatus 400 includes a diode string DS, a first voltage generator 310, a second voltage generator 320 and a light source driver 330.

The diode string DS includes a plurality of LEDs connected in series. The diode string DS is electrically connected to a connector 340 through lamp wires 352*a* and 352*b*. The connector 340 can be disposed on the driving circuit board 350. In the present example embodiment, although only one diode string DS is illustrated, the number of the diode strings DS is not limited to the present example embodiment, and any number of diode strings DS can be present. For example, a plurality of diode strings DS connected to each other in parallel may be connected to the output part 330*b* of the light source driver 330.

The connector 340 may include a first terminal IN1 connected to the output part 330*b* of the light source driver 330, a second terminal OUT1 connected to a first end portion of the diode string DS, a third terminal IN2 connected to second end portion of the diode string DS, and a fourth terminal OUT2 connected to an input electrode of a current controller 336 of the light source driver 330. The first terminal IN1 and the second terminal OUT1 are electrically connected to each other, and the third terminal 1N2 and the fourth terminal OUT2 are electrically connected to each other.

The first voltage generator 310 generates an input voltage Vin and applies the input voltage Vin to an input part 330*a* of the light source driver 330. The first voltage generator 310 may include a transformer having a primary side connected to an output terminal VOUT of the second voltage generator 320, and a secondary side connected to the input part 330*a*. The first voltage generator 310 selectively generates the input voltage Vin based on a voltage applied to the primary side.

The light source driver 330 may include a booster 331, a boosting controller 332, a rectifier 333, a charging part 334, a driving chip 335, the current controller 336 and a protecting circuit 350.

The booster 331 includes an input terminal connected to the input part 330*a* to receive the input voltage Vin, and an output terminal connected to the boosting controller 332 and to the rectifier 333. The booster 331 boosts the input voltage Vin to the driving voltage Vd for driving the diode string DS.

The boosting controller 332 performs on/off switching operations according to control signals from the driving chip 335. The boosting controller 332 includes an input electrode connected to the output terminal of the booster 331, a control electrode connected to a gate terminal GATE of the driving chip 335, and an output electrode connected to a sensing terminal CS of the driving chip 335.

The rectifier 333 may include a first diode D1 and a second diode D2 connected to each other in parallel. Each of the first and second diodes D1 and D2 includes an anode connected to the output terminal of the booster and a cathode connected to the protecting circuit 350.

The charging part 334 is connected to the cathode of the first and second diodes D1 and D2, so as to be charged with the driving voltage Vd rectified by the first and second diodes D1 and D2.

The driving chip 335 may include a power terminal VCC, the gate terminal GATE, the sensing terminal CS, a feedback terminal FDBK, a current control terminal FAULT and a ground terminal GND.

The power terminal VCC receives a chip driving voltage Vcc for driving the driving chip 335.

The gate terminal GATE is connected to the control electrode of the boosting controller 332. The gate terminal GATE outputs a gate control signal for controlling the on/off switching operation of the boosting controller 332. The gate control signal includes a gate on signal to turn on the boosting controller 332 and a gate off signal to turn off the boosting controller 332.

The sensing terminal CS is connected to the output electrode of the boosting controller 332. The driving chip 335 senses an output current flowing through the output electrode of the boosting controller 332 and received at the sensing terminal CS, and controls a duty ratio of the gate control signal outputted from the gate terminal GATE accordingly.

The feedback terminal FDBK receives a current fed back from the diode string DS through the current controller 336. The feedback terminal FDBK is connected to an output electrode of the current controller 336 to receive the current flowing through the diode string DS.

The current controller 336 has an input electrode connected to the fourth terminal OUT2 of the connector 340, a control electrode connected to the current control terminal FAULT, and an output electrode connected to the ground terminal GND of the driving chip 335. The current controller 336 performs on/off switching operations based on a control signal from the current control terminal FAULT.

The current control terminal FAULT is connected to the control electrode of the current controller 336. The driving chip 335 compares the feedback current received at the feedback terminal FDBK to a preset reference value, and stops driving the diode string DS when the feedback current is out of a reference range. The reference range may be variously set according to the design of the circuit. The reference range can be, for example, from the preset reference value to a twice of the preset reference value or to three times of the preset reference value.

The protecting circuit 350 may include a current detector 352, a first rectifying part 353, a first filter 354, a second rectifying part 355, a second filter 356, a first switching part 357 and a photocoupler 358.

The current detector 352 includes a voltage detecting resistor Rs, a voltage divider 351*a* and a second switching part 351*b*.

The voltage detecting resistor Rs includes a first end portion connected to the cathode of the rectifier 333, and a second end portion connected to the output part 330*b* of the light source driver 330. The voltage detecting resistor Rs detects a voltage applied to the rectifier 333.

The voltage divider 351*a* divides the voltage detected by the voltage detecting resistor Rs. The voltage divider 351*a* includes a first resistor R1 and a second resistor R2. The first resistor R1 includes a first end portion connected to the first end portion of the voltage detecting resistor Rs, and a second end portion connected to a control electrode of the second switching part 351*b*. The second resistor R2 includes a first end portion connected between the control electrode of the second switching part 351*b* and the second end portion of the first resistor R1, and a second end portion connected to the output part 330*b*.

The second switching part 351*b* includes an input electrode connected to the second end portion of the second resistor R2, the control electrode connected to the first end portion of the second resistor R2, and an output electrode connected to the first rectifying part 353. The second switching part 351b is turned on when a divided voltage by the voltage divider 351a is equal to or greater than a predetermined level.

The first rectifying part 353 includes a first end portion connected to the output electrode of the second switching part 351b, and a second end portion connected to the first filter 354.

The first filter 354 includes a first end portion connected between the first rectifying part 353 and the second rectifying part 355, and a second end portion connected to a ground terminal. The first filter 354 may include a resistor R3 and a capacitor C1 connected to each other in parallel. The first filter 354 removes noise from the rectified voltage signal produced by the first rectifying part 353.

The second rectifying part 355 includes a first end portion connected to the first filter 354 and a second end portion connected to the second filter 356.

The second filter 356 includes a first end portion connected between the second end portion of the second rectifying part 355 and the control electrode of the first switching part 357, and a second end portion connected to the ground terminal. The second filter 356 may include a resistor R4 and a capacitor C2 connected to each other in parallel. The second filter 356 removes noise from the rectified voltage signal produced by the second rectifying part 355.

The first switching part 357 may include an input electrode connected to the photocoupler 358, a control electrode connected to the first end portion of the second filter 356, and an output electrode connected to the ground terminal The photocoupler 358 includes a light emitting part 358a and a light receiving part 358b.

The light emitting part 358a includes a first end portion connected to a first voltage terminal 359 and receiving a first control voltage, as well as a second end portion connected to the output electrode of the first switching part 357. The light emitting part 358a generates light when powered by the first control voltage applied from the first voltage terminal 359, and when the first switching part 357 is turned on.

The light receiving part 358b includes a first end portion connected to a second voltage terminal 360 that receives a second control voltage, and a second end portion connected to the power control terminal FAULT of the second voltage generator 320. The light receiving part 358b is turned on or off according to an amount of the light generated by the light emitting part 358a. The second control voltage, applied from the second voltage terminal 360, is applied to the power control terminal FAULT of the second voltage generator 320 when the light receiving part 358b is turned on.

The second voltage generator 320 includes the power control terminal FAULT and the output terminal VOUT. The power control terminal FAULT is connected to the light receiving part 358b of the photocoupler 358 to receive the second control voltage. The output terminal VOUT is connected to the first voltage generator 310.

The second voltage generator 320 selectively provides either a first power voltage V1 or a second power voltage V2 to the first voltage generator 310, depending on whether the power control terminal FAULT receives the second control voltage. For example, the second voltage generator 320 applies the first power voltage V1 to the first voltage generator 310 when the second control voltage is received at the power control terminal FAULT. In contrast, the second voltage generator 320 applies the second power voltage V2, greater than the first power voltage V1, to the first voltage generator 310 when the second control voltage is not received at the power control terminal FAULT. For example, the first power voltage V1 may be substantially equal to 0 V.

The first voltage generator 310 stops generating the input voltage Vin when the first power voltage V1 is applied to it. Accordingly, the input voltage Vin applied to the input part 330a is cut off. In contrast, the first voltage generator 310 generates the input voltage Vin when it receives the second power voltage V2, and applies the input voltage Vin to the input part 330a.

Hereinafter, a method of driving the light source driver 330 is explained with reference to FIG. 3.

Referring to FIGS. 2 and 3, the driving chip 335 outputs the gate on signal from the gate terminal GATE when the chip driving voltage Vcc is applied to the power terminal VCC to activate the driving chip 335. The boosting controller 332 is turned on based on the gate on signal. Accordingly, the input voltage Vin received at the input part 330a is accumulated in the booster 331 as an energy. Then, the driving chip 335 outputs a gate off signal from the gate terminal GATE. The boosting controller 332 is turned off based on the gate off signal. Accordingly, the accumulated energy in the booster 331 is boosted to the driving voltage Vd. That is, the booster 331 accumulates energy input from its input voltage Vin, and outputs this energy as a boosted driving voltage Vd. The driving voltage Vd is applied to the output part 330b via the rectifier 333 and the protecting circuit 350.

The protecting circuit 350 detects a current according to the driving voltage Vd applied to the output part 330b. When the current is less than a reference value, the second switching part 351b of the current detector 352 is in a state of being turned off. Accordingly, the second control voltage is not applied to the power control terminal FAULT of the second voltage generator 320. Thus, the second voltage generator 320 outputs the second power voltage V2 to the first voltage generator 310. The first voltage generator 310 generates the input voltage Vin based on the second power voltage V2, and outputs the input voltage Vin to the input part 330a.

When the current to the control terminal of the second switching part 351b is equal to or greater than the above reference value, which can be, for example, a twice of a normal current or three times of the normal current, the second switching part 351b of the current detector 352 is turned on. As the second switching part 351b is turned on, a current according to a voltage divided by the voltage divider 351a is applied to the first switching part 357 via the first rectifying part 353, the first filter 354, the second rectifying part 355 and the second filter 356. Accordingly, the first switching part 357 is turned on. As the first switching part 357 is turned on, a current according to the first control voltage applied from the first voltage terminal 359 is applied to the input electrode of the first switching part 357 through the light emitting part 358a of the photocoupler 358. This current flows to the ground terminal through the output electrode of the first switching part 357. In this process, the light emitting part 358a generates light according to the first control voltage. The light receiving part 358b receives the light, and thus turns on. Accordingly, the second control voltage applied from the second voltage terminal 360 is applied to the power control terminal FAULT of the second voltage generator 320.

As the second control voltage is received at the power control terminal FAULT, the second voltage generator 320 generates the first power voltage V1 and applies the first power voltage V1 to the first voltage generator 310. This signals the first voltage generator 310 to stop generating the input voltage Vin. Thus, the input voltage Vin applied to the input part 330a is cut off.

In operation of the present example embodiment, the input voltage Vin applied to the input part 330*a* is turned off when the current applied to the output part 330*b* exceeds a predetermined reference range, e.g., from the normal current to twice of the normal current or to three times of the normal current, so that elements of the light driver 330 may be prevented from being damaged due to excessive voltages or currents. For example, the protecting circuit 350 can protect against excessively high magnitudes of the current resulting from the driving voltage output from the booster 331. That is, in maintaining driving voltage Vd, booster 331 may produce excessively high currents, and the protecting circuit 350 can prevent damage from these excessive currents. It can also be seen that this and other embodiments can protect against shorts or overcurrents caused by, for example, stripped lamp wires that contact the driver circuit 330, are more effectively prevented from damaging the circuit 330 or other components.

Figure 4:
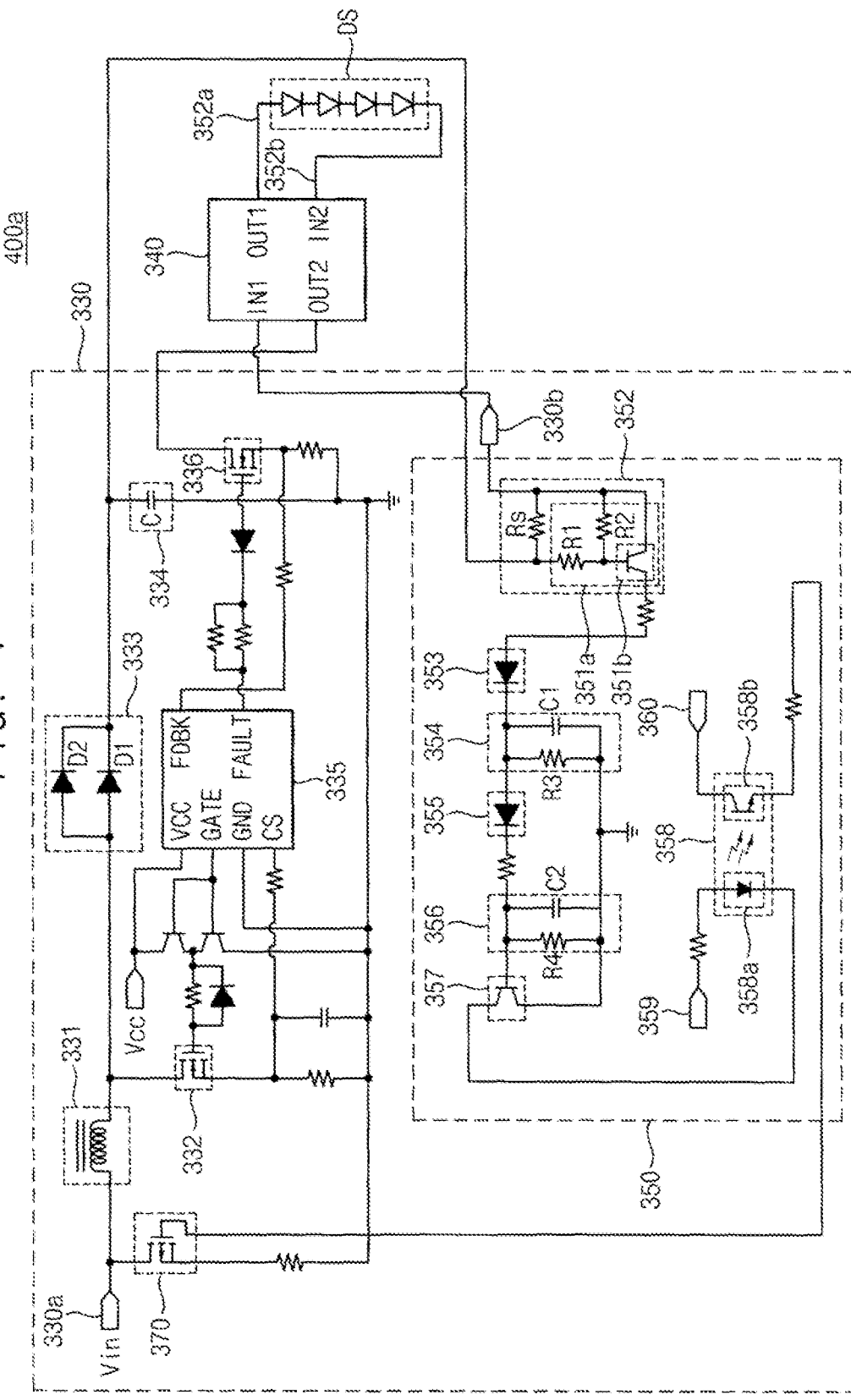
FIG. 4 is a circuit diagram illustrating a light source apparatus according to another example embodiment of the present invention.

FIG. 4 is a circuit diagram illustrating a light source apparatus according to another example embodiment of the present invention.

The light source apparatus 400*a* according to the present example embodiment is substantially the same as the light source apparatus 400 of FIGS. 1 to 3, except that the light driver 330 further includes a cut off switching part 370 that is directly connected to the protecting circuit 350. Thus, the same reference numerals will be used to refer to the same or like parts as those described in previous example embodiment of FIGS. 1 to 3, and any further explanation concerning the above elements will be largely omitted.

Referring to FIGS. 2 and 4, the light source apparatus 400*a* includes the diode string DS and the light source driver 330.

The light source driver 330 may include the booster 331, the boosting controller 332, the rectifier 333, the charging part 334, the driving chip 335, the current controller 336, the protecting circuit 350 and the cut off switching part 370.

The protecting circuit 350 includes the current detector 352, the first rectifying part 353, the first filter 354, the second rectifying part 355, the second filter 356, the first switching part 357 and the photocoupler 358. The current detector 352 includes the voltage detecting resistor Rs, the voltage divider 351*a* and the second switching part 351*b*. The second switching part 351*b* is turned on when a current applied to the output part 330*b* is equal to or greater than the reference value.

The cut off switching part 370 is connected between the input part 330*a* and the output terminal of the protecting circuit 350. The cut off switching part 370 includes an input electrode connected to the input part 330*a*, a control electrode connected to an output terminal of the protecting circuit 350 (which is an output terminal of the photocoupler 358) and an output electrode connected to the ground terminal The cut off switching part 370 is turned on when the second control voltage is applied from the photocoupler 358. The input voltage Vin applied to the input part 330*a* is transmitted to the booster 331 when the cut off switching part 370 is in its off state. Alternatively, the current due to the application of input voltage Vin to the input part 330*a* flows to the ground terminal through the output electrode of the cut off switching part 370 when the cut off switching part 370 is turned on. Thus, the input voltage is not transmitted to the booster 331 when the cut off switching part 370 is turned on.

Hereinafter, a method of driving the light source driver 330 is explained with reference to FIG. 4.

Referring to FIGS. 2 and 4, the driving chip 335 outputs the gate on signal from the gate terminal GATE when the chip driving voltage Vcc is applied to the power terminal VCC to activate the driving chip 335. The boosting controller 332 is turned on based on the gate on signal. Accordingly, the input voltage Vin received at the input part 330*a* is accumulated in the booster 331 as energy. Then, the driving chip 335 outputs a gate off signal from the gate terminal GATE. The boosting controller 332 is turned off based on the gate off signal. Accordingly, the accumulated energy in the booster 331 is output as the driving voltage Vd, having been boosted from the lower voltage Vin. The driving voltage Vd is applied to the output part 330*b* via the rectifier 333 and the protecting circuit 350.

The protecting circuit 350 detects the current from the driving voltage Vd that is applied to the output part 330*b*. When the current is less than the reference value, the second switching part 351*b* of the current detector 352 is in its off state. Accordingly, the second control voltage is not applied to the control electrode of the cut off switching part 370, and the cut off switching part 370 is turned off. The input voltage Vin applied to the input part 330*a* is thus applied to the booster 331, uninterrupted.

When the current associated with the driving voltage Vd is equal to or greater than the reference value, the second switching part 351*b* of the current detector 352 is turned on. When the second switching part 351*b* is turned on, the current from the voltage divided by the voltage divider 351*a* is applied to the first switching part 357 via the first rectifying part 353, the first filter 354, the second rectifying part 355 and the second filter 356. Accordingly, the first switching part 357 is turned on. When the first switching part 357 is turned on, the current from the first control voltage applied from the first voltage terminal 359 is applied to the input electrode of the first switching part 357 through the light emitting part 358*a*. The current applied to the input electrode of the first switching part 357 flows to the ground terminal through the output electrode of the first switching part 357. In this process, the light emitting part 358*a* generates light according to the first control voltage. The light receiving part 358*b* receives this light and is thereby turned on, transmitting the second control voltage applied to the second voltage terminal 360 to the control electrode of the cut off switching part 370.

The cut off switching part 370 is thus turned on, and the current from the input voltage Vin flows to the ground terminal through the cut off switching part 370. Thus, the input voltage Vin applied to the input part 330*a* is cut off from the booster 331.

According to the present example embodiment, the input voltage Vin applied from the input part 330*a* to the booster 331 is cut off when the current applied to the output part 330*b* is out of the reference range. This prevents elements of the light driver 330 from being damaged by increases in the input voltage Vin, or by overcurrents or shorts.

As described above, according to the present invention, the input voltage applied to the input part of the light source driver is cut off when an overcurrent is detected at the output part of the light source driver, so as to prevent damage to the light source driving circuit. Circuits of the invention can thus protect against excessive currents generated by booster 331 in maintaining its output voltage Vd. It can also be seen that this and other embodiments can protect against shorts or overcurrents caused by, for example, stripped lamp wires that contact the driver circuit 330, are more effectively prevented from damaging the circuit 330 or other components.

In addition, the input voltage applied to the booster is cut off when an overcurrent is detected at the output part of the light source driver, further preventing damage to the light source driving circuit.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A light source apparatus comprising:
    a light source; and
    a light source driver comprising:
        a booster boosting an input voltage to a driving voltage for driving the light source, and
        a protecting circuit selectively cutting off the input voltage applied to the booster according to an output current of the booster,
    wherein the protecting circuit comprises:
        a current detector connected to an output terminal of the booster to detect a current corresponding to the output current of the booster;
        a first switching part switched on and off according to the current detected by the current detector; and
        a photocoupler outputting a control voltage for cutting off the input voltage in response to a switching on of the first switching part.

2. The light source apparatus of claim 1, wherein the protecting circuit cuts off the input voltage applied to the booster when a magnitude of the output current of the booster exceeds a first reference range.

3. The light source apparatus of claim 1, wherein the protecting circuit further comprises:
    a first rectifying part comprising a first node connected to the current detector; and
    a first filter comprising a first node connected to a second node of the first rectifying part and a second node connected to a ground terminal.

4. The light source apparatus of claim 3, wherein the protecting circuit further comprises:
    a second rectifying part comprising a first node connected to the first node of the first filter; and
    a second filter comprising a first node connected to the second node of the second rectifying part, and a second node connected to the ground terminal.

5. The light source apparatus of claim 1, wherein the current detector comprises:
    a voltage detecting resistor connected between the booster and an output part of the light source driver;
    a voltage divider dividing the voltage detected by the voltage detecting resistor; and
    a second switching part switched on and off according to a divided voltage that corresponds to the voltage divided by the voltage divider.

6. The light source apparatus of claim 5, wherein the protecting circuit further comprises:
    a first rectifying part comprising a first node connected to the current detector; and
    a first filter comprising a first node connected to a second node of the first rectifying part and a second node connected to a ground terminal.

7. The light source apparatus of claim 6, wherein the protecting circuit further comprises:
    a second rectifying part comprising a first node connected to the first node of the first filter; and
    a second filter comprising a first node connected to the second node of the second rectifying part and a second node connected to the ground terminal.

8. The light source apparatus of claim 1, wherein the light source comprises a plurality of LEDs.

9. The light source apparatus of claim 8, wherein the light source comprises a first light source disposed adjacent to a first side portion of a light guide plate, a second light source disposed adjacent to a second side portion of the light guide plate, the second side portion being opposite to the first side portion, a third light source disposed adjacent to a third side portion of the light guide plate, the third side portion being connected to the first and second side portions, and a fourth light source disposed adjacent to a fourth side portion of the light guide plate, the fourth side portion being opposite to the third side portion.

10. The light source apparatus of claim 1, further comprising a first voltage generator connected to an output of the photocoupler, the first voltage generator selectively generating the input voltage according to the output of the photocoupler.

11. The light source apparatus of claim 10, further comprising a second voltage generator connected between an output terminal of the photocoupler and the first voltage generator to selectively apply a first power voltage or a second power voltage to the first voltage generator depending on whether the control voltage is received from the photocoupler,
    wherein the first voltage generator cuts off the input voltage when the first power voltage is applied, and
    wherein the first voltage generator generates the input voltage and applies the input voltage to the booster when the second power voltage is applied.

12. The light source apparatus of claim 10, wherein the protecting circuit further comprises:
    a first rectifying part comprising a first node connected to the current detector; and
    a first filter comprising a first node connected to a second node of the first rectifying part and a second node connected to a ground terminal.

13. The light source apparatus of claim 12, wherein the protecting circuit further comprises:
    a second rectifying part comprising a first node connected to the first node of the first filter; and
    a second filter comprising a first node connected to the second node of the second rectifying part and a second node connected to the ground terminal.

14. The light source apparatus of claim 10, wherein the current detector comprises:
    a voltage detecting resistor connected between the booster and an output part of the light source driver;
    a voltage divider dividing the voltage detected by the voltage detecting resistor; and
    a second switching part switched on and off according to a divided voltage that corresponds to the voltage divided by the voltage divider.

15. The light source apparatus of claim 14, wherein the protecting circuit further comprises:
    a first rectifying part comprising a first node connected to the current detector; and a first filter comprising a first node connected to a second node of the first rectifying part and a second node connected to a ground terminal.

16. The light source apparatus of claim 15, wherein the protecting circuit further comprises:
a second rectifying part comprising a first node connected to the first node of the first filter; and
a second filter comprising a first node connected to the second node of the second rectifying part and a second node connected to the ground terminal.

17. The light source apparatus of claim 1, further comprising a second switching part connected between an input terminal of the booster and an output terminal of the photocoupler, so as to ground the input voltage applied to the booster when the control voltage is received from the photocoupler.

18. The light source apparatus of claim 17, wherein the current detector comprises:
a voltage detecting resistor connected between the booster and an output part of the light source driver;
a voltage divider dividing the voltage detected by the voltage detecting resistor; and
a second switching part switched on and off according to a divided voltage that corresponds to the voltage divided by the voltage divider.

19. The light source apparatus of claim 18, wherein the protecting circuit further comprises:
a first rectifying part comprising a first node connected to the current detector; and
a first filter comprising a first node connected to a second node of the first rectifying part and a second node connected to a ground terminal.

20. The light source apparatus of claim 19, wherein the protecting circuit further comprises:
a second rectifying part comprising a first node connected to the first node of the first filter; and
a second filter comprising a first node connected to the second node of the second rectifying part and a second node connected to the ground terminal.

21. The light source apparatus of claim 17, wherein the protecting circuit further comprises:
a first rectifying part comprising a first node connected to the current detector; and
a first filter comprising a first node connected to a second node of the first rectifying part and a second node connected to a ground terminal.

22. The light source apparatus of claim 21, wherein the protecting circuit further comprises:
a second rectifying part comprising a first node connected to the first node of the first filter; and
a second filter comprising a first node connected to the second node of the second rectifying part and a second node connected to the ground terminal.

23. A light source apparatus comprising:
a light source disposed adjacent to a side portion of a light guide plate; and
a light source driver comprising:
a booster boosting an input voltage to a driving voltage for driving the light source, and
a protecting circuit selectively cutting off the input voltage applied to the booster according to an output current of the booster,
wherein the protecting circuit cuts off the input voltage applied to the booster when a magnitude of the output current of the booster exceeds a first reference range, wherein the light source driver further comprises a boosting controller connected to an output terminal of the booster to control the driving voltage output from the booster and a driving chip controlling the boosting controller,
wherein the light source driver further comprises a current controller comprising an input electrode connected to an output terminal of the light source, a control electrode in electrical communication with the driving chip and an output electrode in electrical communication with a ground terminal, and
wherein the driving chip switches the current controller off when a magnitude of a current fed back from the light source exceeds a second reference range.

* * * * *